(12) United States Patent
Kawasaki et al.

(10) Patent No.: US 7,680,579 B2
(45) Date of Patent: Mar. 16, 2010

(54) EDDY CURRENT DETECTION OF WHEEL SPEED WITH VOLTAGE THRESHOLD SHIFTING

(75) Inventors: Norifumi Kawasaki, Nagoya (JP); Hideo Kita, Nagoya (JP)

(73) Assignee: Central Japan Railway Company, Aichi (JP)

( * ) Notice: Subject to any disclaimer, the term of this patent is extended or adjusted under 35 U.S.C. 154(b) by 69 days.

(21) Appl. No.: 11/948,384

(22) Filed: Nov. 30, 2007

(65) Prior Publication Data

US 2008/0074099 A1 Mar. 27, 2008

Related U.S. Application Data

(62) Division of application No. 10/542,054, filed on Jul. 12, 2005, now Pat. No. 7,324,887.

(51) Int. Cl.
*B60T 8/32* (2006.01)
(52) U.S. Cl. .................. 701/93; 701/1; 701/70; 701/94; 701/95; 123/350; 123/351; 123/352; 123/363; 180/170; 180/171; 180/172; 180/178
(58) Field of Classification Search ................. 701/1, 701/70, 93, 94, 95
See application file for complete search history.

(56) References Cited

U.S. PATENT DOCUMENTS

| | | | | |
|---|---|---|---|---|
| 4,258,319 | A * | 3/1981 | Shimada et al. | 324/226 |
| 4,847,556 | A * | 7/1989 | Langley | 324/207.18 |
| 4,894,613 | A * | 1/1990 | Tsugawa | 324/173 |
| 5,004,980 | A * | 4/1991 | Ida et al. | 324/166 |
| 5,220,974 | A * | 6/1993 | Kim | 180/415 |
| 5,231,391 | A * | 7/1993 | Rigaux | 340/448 |
| 5,451,867 | A * | 9/1995 | Loreck et al. | 324/166 |
| 5,926,016 | A * | 7/1999 | Pattantyus | 324/166 |
| 6,147,486 | A * | 11/2000 | Koss et al. | 324/166 |
| 6,480,771 | B2 * | 11/2002 | Nishida et al. | 701/34 |
| 6,965,227 | B2 * | 11/2005 | Blossfeld | 324/166 |
| 7,324,887 | B2 * | 1/2008 | Kawasaki et al. | 701/93 |
| 2001/0027362 | A1 * | 10/2001 | Nishida et al. | 701/34 |
| 2003/0093188 | A1 * | 5/2003 | Morita et al. | 701/1 |

(Continued)

FOREIGN PATENT DOCUMENTS

JP 59-5962 A 1/1984

(Continued)

*Primary Examiner*—Khoi Tran
*Assistant Examiner*—Jonathan Sample
(74) *Attorney, Agent, or Firm*—Sughrue Mion, PLLC (57) ABSTRACT

A wheel speed detection system including a rotator, a sensor head, a detector, a pulse converter, a speed calculator and a threshold shifter. Plural concave and convex portions are formed on a periphery of the rotator rotating together with a wheel. The sensor head includes a coil to generate an alternate current magnetic field. The detector excites the coil to generate an eddy current on the concave and convex portions, and outputs alternate current detection signals corresponding to changes in the eddy current generated with rotation of the rotator. The pulse converter converts the alternate current detection signals into pulse signals according to preset threshold levels. The speed calculator calculates rotational speed of the wheel based on the pulse signals. The threshold shifter shifts the threshold levels corresponding to a difference between a default average and an average of the alternate current detection signals actually outputted from the detector.

9 Claims, 10 Drawing Sheets

U.S. PATENT DOCUMENTS

2003/0132748 A1* 7/2003 Hiroshima ................. 324/240
2004/0085063 A1* 5/2004 Jin et al. ................ 324/207.16
2006/0250143 A1* 11/2006 Moon et al. ................. 324/674

FOREIGN PATENT DOCUMENTS

| | | |
|---|---|---|
| JP | 63-70118 A | 3/1988 |
| JP | 2000-121655 A | 4/2000 |
| JP | 2000-309258 A | 11/2000 |
| JP | 2002-196013 A | 7/2002 |

* cited by examiner

EDDY CURRENT DETECTION OF WHEEL SPEED WITH VOLTAGE THRESHOLD SHIFTING

This is a divisional of application Ser. No. 10/542,054 filed Jul. 12, 2005 now U.S. Pat. No. 7,324,887. The entire disclosure of the prior application, application Ser. No. 10/542,054 is considered part of the disclosure of the accompanying divisional application and is hereby incorporated by reference.

TECHNICAL FIELD

This invention relates to a wheel speed detection system for detecting rotational speed of wheels on various types of vehicles.

BACKGROUND ART

Conventionally, as a wheel speed detection system on various types of vehicles, a wheel speed detection system, for example, wherein a magnetic encoder is used is known, and has been the primary method, especially for automobiles, to detect the speed of a vehicle necessary for brake control and others.

Meanwhile, magnetically levitated trains (to be referred to as linear vehicles) with primary side on ground system, wherein a vehicle is propelled by controlling power supply to propulsion coils on the ground, travel on wheels in a speed level wherein the speed is lower than predetermined speed (for example, in the low hundred km/h). Additionally, traveling control on a linear vehicle is basically conducted on the ground side for all speed levels. However, if there is a problem in the ground side control, or in a superconductive magnet mounted on the vehicle, for example, speed control from the ground side might not be possible. For this kind of possibility, a disc brake device which brakes wheel rotation is mounted on a linear vehicle as an emergency brake.

For controlling this disc brake device, it is necessary to detect rotational speed of wheels, as well as in automobiles mentioned above. However, as well known, wheels on a linear vehicle are positioned in a powerful magnetic field formed mainly by a superconducting magnet, and it is extremely difficult to detect rotational speed accurately using a magnetic sensor such as a magnetic encoder, or a magnetostrictive sensor in such a powerful magnetic field. Besides, for principles of a magnetic encoder, a rotator thereof is required to be magnetic. Nevertheless, due to a limitation that linear vehicles are used in a powerful magnetic field, basically magnetic materials are not used therein, and mounting a magnetic encoder itself is difficult. Thereby, in a linear vehicle, rotational speed of wheels has been conventionally detected by an optical encoder.

Figure 8:
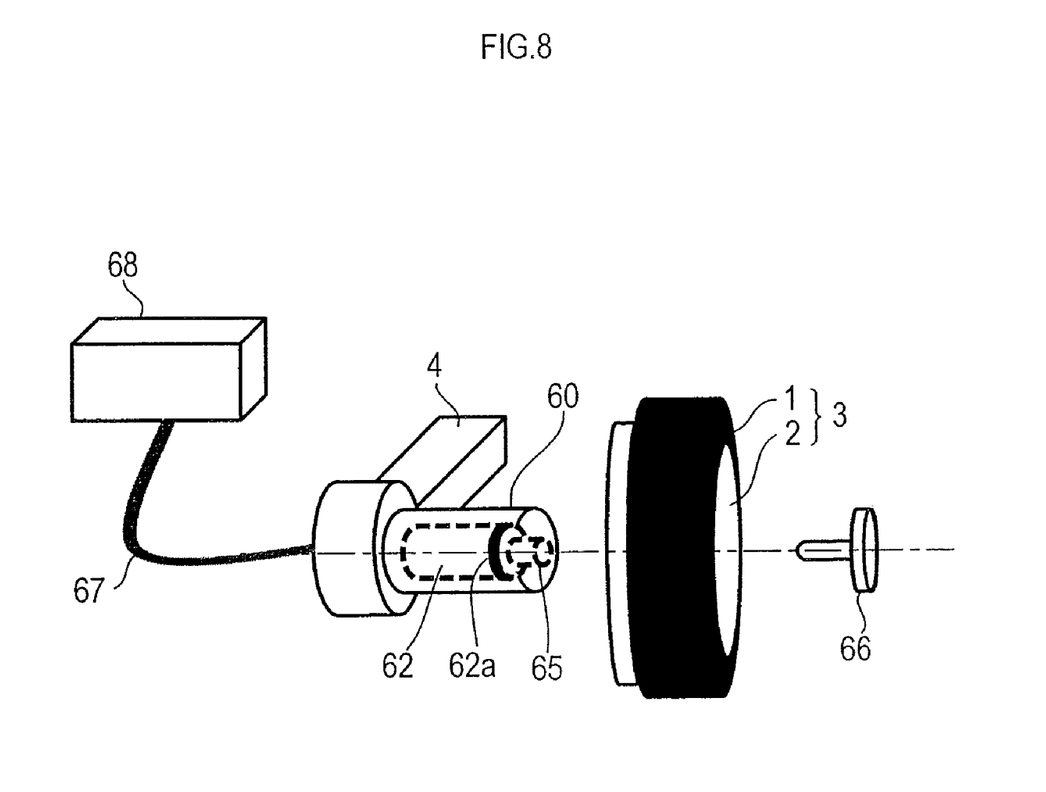
FIG. 8 is an explanatory view showing a schematic structure of a wheel speed detection system with an optical encoder mounted on a magnetically levitated train.

In FIG. 8, the schematic structure of a conventional optical encoder type of wheel speed detection system mounted on a linear vehicle is shown. The wheel speed detection system shown in FIG. 8 is mainly constituted with an optical encoder 62 comprising a slit disk 62a which rotates together with a support wheel 3 configured with a tire 1 and an aluminum wheel (to be referred to simply as wheel) 2, and a signal processing device 68 connected to the optical encoder 62 via an optical cable 67.

The optical encoder 62 is disposed in a wheel axle 60 on one end of an arm 4 constituting a support leg device (to be described in detail later; refer to FIG. 1). By joining a coupling 65 in the side of the optical encoder 62 and a coupling 66 in the side of the wheel 2, the slit disk 62a is rotated along with the rotation of the support wheel (to be referred to simply as wheel) 3.

Then, light from a projector inside the signal processing device 68 is projected to the slit disk 62a via the optical cable 67. When the light is reflected, the reflected light is transmitted via the optical cable 67 and received by the signal processing device 68. Based on the presence/absence of the reflected light and the timing of reception thereof, the rotational speed of a wheel is detected.

Although the wheel speed detection system by means of the optical encoder 62 can conduct accurate detection in a vehicle such as a linear vehicle which is in a powerful magnetic field, there are some problems, such as the price of the optical encoder 62 itself being high, or the incapability of accurate detection due to attenuation of light amount caused by aged deterioration.

Moreover, since the couplings 65 and 66 are respectively coupled in order to rotate the slit disk 62a, there is another problem that the workload in maintenance, such as replacing tires, is increased. That is, to remove the wheel 3 from the wheel axle 60, it is necessary to remove the respective couplings 65 and 66 first. This work consumes a lot of time in maintaining an entire linear vehicle.

On the other hand, as another wheel speed detection system, other than magnetic type or optical type described above, a system by means of an eddy current displacement sensor has been proposed. This system is constituted so that concavities and convexities are disposed with certain intervals on the periphery of a rotator, for example, and an eddy current displacement sensor is fixed in a position, a certain distance away from the concavity and convexity surfaces. The sensor detects that the concave and the convex portions alternately face the sensor corresponding to the rotation of the rotator (wheel rotation), and wheel rotational speed is detected from the detection signals (detection voltage of alternating current) (e.g. refer to Document 1).

Figure 9:
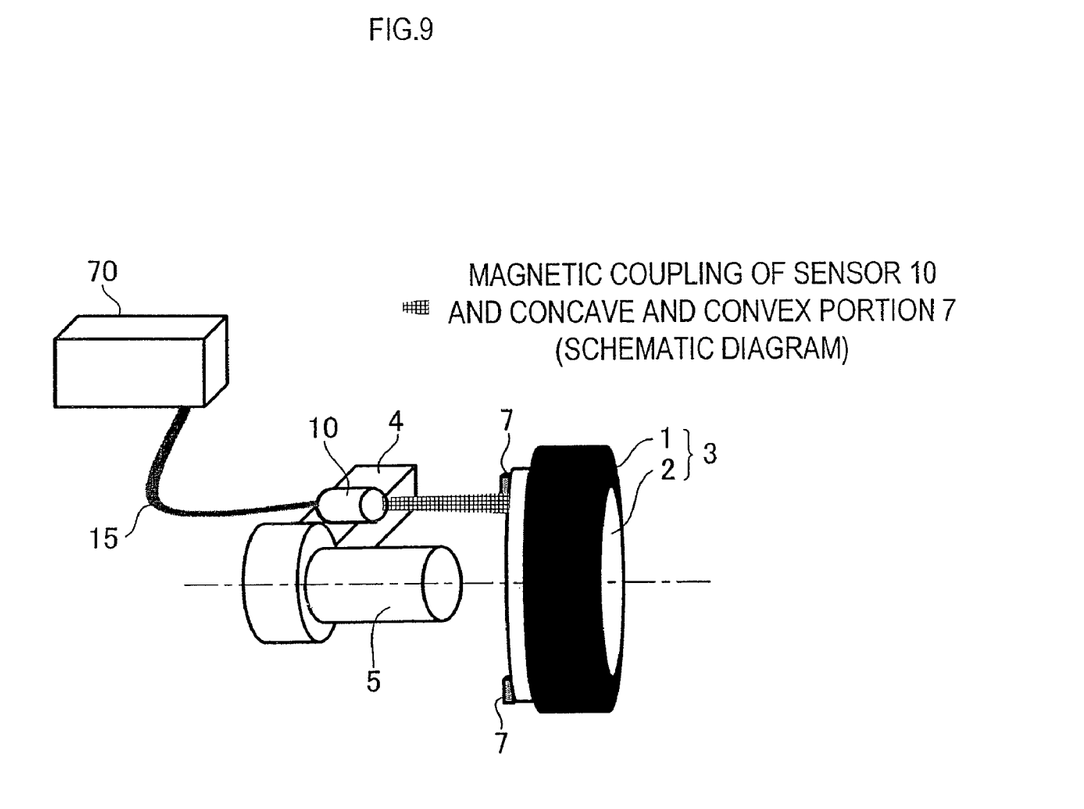
FIG. 9 is an explanatory view showing a schematic structure of a case wherein an eddy current displacement sensor is used as a wheel speed detection system of a magnetically levitated train.

Consequently, it can be considered to adopt a wheel speed detection system with this eddy current displacement sensor in a linear vehicle. More specifically, as FIG. 9 shows, concave and convex portion 7 is disposed on the periphery of inside the wheel 2 (in the vehicle body side), and an eddy current displacement sensor (to be referred to simply as eddy current sensor) 10 is fixed on the arm 4 so as to face the concave and convex portion 7. Thereby, the concave and convex portion 7 which directly face the eddy current sensor 10 change alternately such as; the concave portion→convex portion→ concave portion . . . , corresponding to the rotation of the wheel 3. Detection voltage in accordance with this change is transmitted to the signal processing device 70 via a cable 15. In the signal processing device 70, this detection voltage is converted into pulse signals according to predetermined threshold levels, and rotational speed is calculated from the converted pulse signals.

If a system is built as described above to detect wheel rotational speed by using an eddy current sensor 10, it is not necessary to mount a sensor in the wheel axle 5, while it is necessary in an optical encoder type. In the support leg device, only fixing the eddy current sensor 10 on the arm 4 is required. Hence, when maintenance of the wheel 3 is conducted, there is no need to handle the parts constituting the wheel speed detection system for joining and detaching the couplings in an optical encoder type, for example, consequently the workload in maintenance is decreased. Moreover, since an optical cable is not used, the characteristic problems of optical encoders, such as attenuation of an optical cable, can be solved.

[Document 1]
Unexamined Japanese Patent Publication No. 2000-121655

However, if a wheel speed detection system using an eddy current sensor is applied to a linear vehicle, from the reasons (1) and (2) described below, there was a problem that the distance between the entire concave and convex portion 7 and the eddy current sensor 10 (more specifically, the distance d between a surface of a convex portion and the eddy current sensor 10; refer to FIGS. 10A and 10B to be described later) which should normally be retained certain distance might be changed.

(1) In a rotator, such as a wheel 3 of a linear vehicle, which supports large load, the distance between the eddy current sensor 10 and the entire concave and convex portion 7 changes owing to fluctuation during rotation or change in the load on the wheel. Particularly in case of a linear vehicle, a wheel center (the wheel axle 5) and a shaft of an actuator in a support leg 6 (not shown in FIG. 9, refer to FIG. 1 to be described later) that receives vertical load are offset. Thus the arm 4 is twisted due to the load received from the support leg 6. When the load changes, i.e. the state of the twisting changes because of the change in the load on the wheel, a change in the above mentioned distance is caused.

(2) For a linear vehicle, work such as maintenance of the wheel 3 or tire change is conducted relatively frequently. Hence, due to an error in assembly during maintenance, the distance between the eddy current sensor 10 and the entire concave and convex portion 7 changes at every maintenance of the wheel 3 or tire change. Additionally, when a wheel 2 itself, wherein the concave and convex portion 7 is disposed, is changed, owing to production tolerance of the wheel 2, the above-mentioned distance might be, as expected, changed.

If the distance between the entire concave and convex portion 7 and the eddy current sensor 10 changes as described above, it becomes difficult to accurately detect the wheel rotational speed based on detection voltage from the eddy current sensor 10. This mechanism is going to be described based on FIGS. 10A and 10B. FIGS. 10A and 10B are graphs showing examples of sensor detection voltage and pulse output, in case an eddy current sensor is used as a wheel speed detection system of a linear vehicle.

Figure 10A:
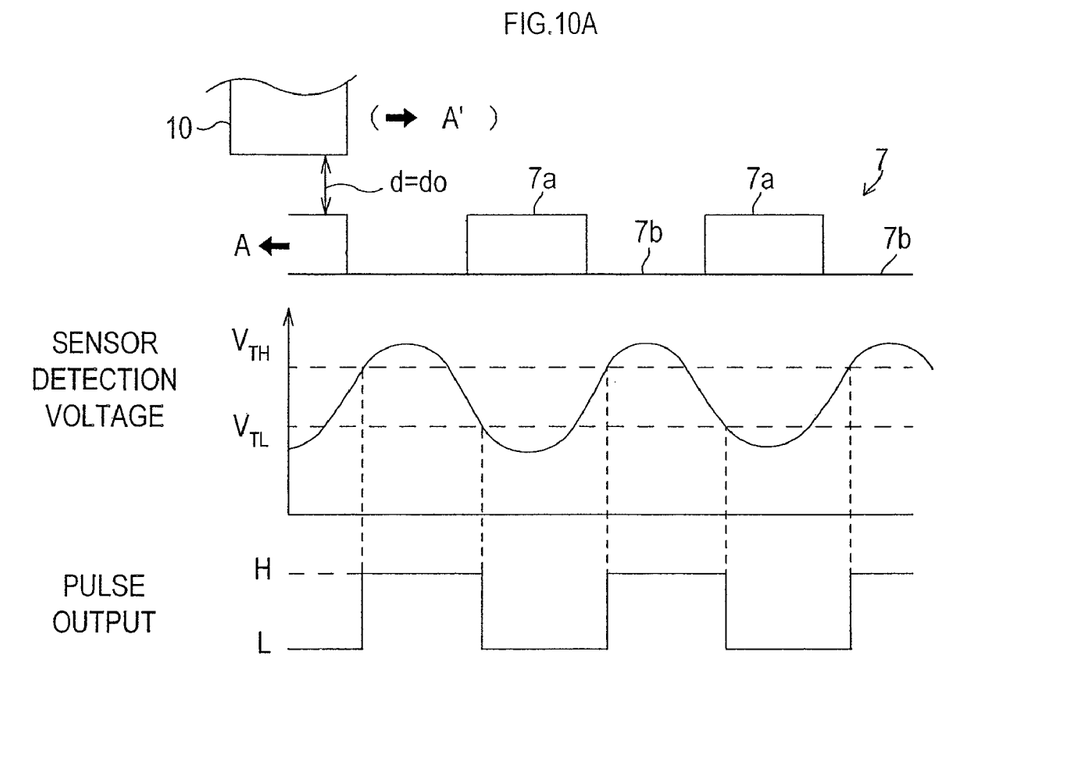
FIGS. 10A and 10B are graphs showing examples of detection voltage and pulse output in a case wherein an eddy current displacement sensor is used as a wheel speed detection system of a magnetically levitated train.

Firstly, FIG. 10A shows a case when the distance between the eddy current sensor 10 and a convex portion 7a is normal ($d=d_0$). By rotation of the wheel 3, when the concave and convex portion 7 is moved (rotated) to the direction of an arrow A, the eddy current sensor 10 alternately faces; the convex portion 7a → the concave portion 7b → the convex portion 7a .... It is to be noted that moving the concave and convex portion 7 in the direction of the arrow A with respect to the eddy current sensor 10, and moving the eddy current sensor 10 in the direction of the arrow A' with respect to the concave and convex portion 7 are substantially the same. Thus, hereinafter, in the descriptions of FIGS. 10A and 10B, and in the descriptions of FIGS. 4A, 4B, FIGS. 7A and 7B which are to be described later, it is described that the eddy current sensor 10 is moved equivalently in the direction of the arrow A' by rotation of the wheel 3.

Due to the movement of the eddy current sensor 10, detection voltage with sinusoidal waves as shown in the drawing is obtained. In order to convert detection voltage into pulse signals, threshold voltages $V_{TH}$ and $V_{TL}$ having hysteresis are set in advance. Thereby, detection voltage is converted into pulse signals as shown in the drawing.

Figure 10B:
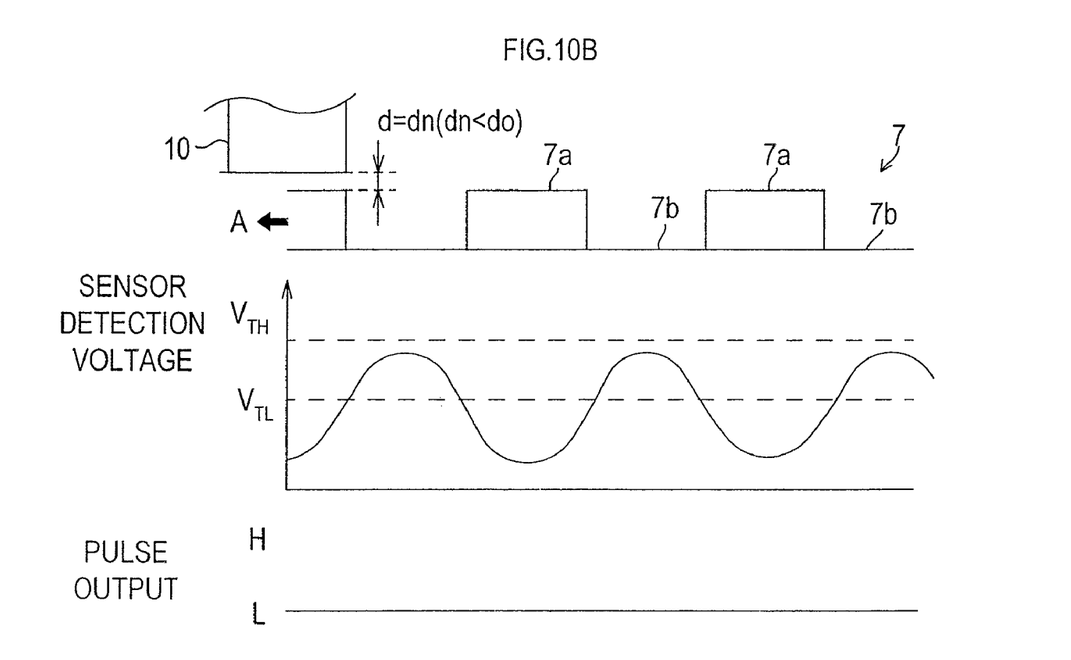

However, due to a change in the load on a wheel or an error in assembly, when the distance d between the eddy current sensor 10 and the convex portion 7a becomes adjacent as shown in FIG. 10B ($d=d_n<d_0$), by the sensing principle of the eddy current sensor 10, detection voltage becomes small, and the amplitude range of detection voltage might become smaller than threshold voltage $V_{TH}$.

Consequently, conversion into pulse signals at the level of threshold $V_{TH}$ cannot be conducted and, as shown in the figure, pulse signals in the low level are constantly outputted. Conversely, although it is not shown in the figure, when the eddy current sensor 10 is distant from the convex portion 7a ($d>d_0$), the sensor detection voltage reaches higher level than the state in FIG. 10A, and the level of the threshold $V_{TL}$ might become smaller than the amplitude of the detection voltage. Accordingly, pulse signals in the high level are constantly outputted.

The present invention was made in view of the above issues, and its object is to be able to detect wheel rotational speed accurately even when the distance between an eddy current sensor and a convex portion is changed owing to various factors such as a change in load on a wheel or an error in assembly.

DISCLOSURE OF INVENTION

In order to attain the above object, a wheel speed detection system of the present invention comprises a rotator which rotates on an axle center of a wheel together with the wheel, and plural concave and convex portions formed on a periphery thereof along a rotational direction (circumference direction) with predetermined intervals therebetween; a sensor head disposed so as to face a surface of a convex portion with certain distance therebetween, and constituted with a coil to generate alternate current magnetic field therearound under supply of alternate current; a detector which excites the coil by supplying alternate current to generate eddy current on the concave and convex portions, and outputs alternate current detection signals corresponding to a change in an amount of eddy current generated with rotation of the rotator; a pulse converter which converts the outputted alternate current detection signals into pulse signals according to preset threshold levels; and a speed calculator which calculates wheel rotational speed based on converted pulse signals.

That is, the wheel speed detection system of the present invention is, on an equality with a wheel speed detection system with a conventional eddy current displacement sensor, to detect wheel rotational speed based on a change in the amount of eddy current generated with the rotation of a rotator. Additionally, the surfaces of a convex portion and the sensor head are disposed so as to face each other with certain distance therebetween. In other words, the distance between a surface of a concave portion and the sensor head is also constant.

However, as described in an issue of the conventional skill, when, for example, load on a wheel (load on an axle) changes, or when the wheel and the rotator are detached and attached again in a maintenance operation of wheels, due to a mechanical twist on members supporting and fixing the rotator and the sensor head, or an error in assembling these members, there is a possibility that the facing distance between the surface of a convex portion and the sensor head might be changed from the above-mentioned certain distance.

Consequently, in the present invention, a threshold shifter shifts threshold levels corresponding to the actual facing distance between the surface of a convex portion and the sensor head. When the threshold levels are shifted by the threshold shifter, the pulse converter conducts a conversion into pulse signals according to the threshold levels after the shifting. Thereby, even when the distance between the surface of a convex portion and the sensor head, which is originally supposed to be retained to be certain distance, is changed, according to the change, threshold levels can be adjusted to appropriate levels.

Thus, according to the wheel speed detection system of the present invention, even when the distance between the surface of a convex portion and the sensor head changes due to a change in load on the axle and the like, the pulse converter conducts conversion into pulse signals according to appropriate threshold levels corresponding to the change. Consequently, wheel rotational speed can be detected accurately.

It is to be noted that a change in the amount of eddy current appears as impedance change in a coil, in the same manner as in a general eddy current displacement sensor, for example. Thereby, alternate current detection signals corresponding to the change can be taken out, for example, as a change in resonant voltage of a resonant circuit including the coil.

In addition, formation of concave and convex portions can be done in a manner so that a change in the amount of eddy current corresponding to wheel rotational speed can be detected. For example, as described in FIG. 9, the concave and convex portions can be formed on a periphery of a surface perpendicular to the rotational axis of the rotator. For another example, the concave and convex portions can be formed on a lateral surface of the rotator recited in aforementioned Document 1 (that is, a gear is used as the rotator).

Furthermore, shifting of threshold levels by the threshold shifter can be constantly conducted. However, in some cases when, for example, there is little difference between the actual facing distance and the above-mentioned certain distance, it is acceptable to make a pulse from alternate current detection voltage without a shifting, according to preset threshold levels. Therefore, the shifting can be conducted only when, for example, it is determined to be necessary to shift threshold levels by checking actual alternate current detection voltage. Determination whether or not threshold levels are to be shifted can be conducted arbitrarily depending on the degree in the change of the facing distance.

With this constitution, a shifting of threshold levels by the threshold shifter can be done, specifically, so that threshold levels fall within the amplitude range of alternate current detection signals outputted from the detector. If threshold levels are at least in the amplitude range of alternate current detection signals, alternate current detection signals can be converted into pulse signals according to threshold levels, and thereby wheel rotational speed can be detected accurately.

It is to be noted that, also in this case, determination whether or not threshold levels should be shifted can be arbitrary conducted. Threshold levels can be shifted only when, for example, threshold levels are out of the amplitude range of actual alternate current detection signals (such as a case in FIG. 10B). Additionally, threshold levels can be shifted also when threshold levels are within the amplitude range but near to the maximum value or the minimum value of alternate current detection signals.

Additionally, the degree how much the threshold shifter shifts threshold levels can be determined by various methods. It can be determined, for example, corresponding to the difference between actual alternate current detection signals and alternate current detection signals when the facing distance is the above-mentioned certain distance.

In other words, in a wheel speed detection system with this constitution, the threshold shifter obtains a difference between a default average, which is the average of alternate current detection signals when the facing distance between the surface of a convex portion and the sensor head is the above-mentioned certain distance, and an average of actual alternate current detection signals outputted from the detector. Corresponding to the difference, the threshold shifter shifts threshold levels.

In this case, for example, the shifting amount can be as much as the difference. For another example, it can be constituted so that in case the difference is little (that is, in case when the amount of change in the facing distance is little), the threshold shifter does not shift threshold levels, but shifts threshold levels only in case when the difference is large.

As described above, if the amount of a shifting is determined depending on the difference between the default average and the average of actual alternate current detection signals, threshold levels can be more appropriately shifted, and the reliability of the wheel speed detection system can be improved.

As for threshold levels, a method, for example, wherein only one level is set to determine whether alternate current detection signals are higher or lower than the level and to make a pulse from alternate current detection signals, is possible. Nevertheless, in consideration of noise tolerance and others, it is more preferable to set two threshold levels with hysteresis. Consequently in this case, the threshold shifter preferably shifts both of the two threshold levels while retaining the amount of hysteresis.

Next, the wheel speed detection system of the present invention comprises a rotator, a sensor head, a detector, a pulse converter, and a speed calculator. A detection signal shifter shifts alternate current detection signals outputted by the detector for some level corresponding to an actual facing distance between the surface of a convex portion and the sensor head. In this manner, when alternate current detection signals are shifted by the detection signal shifter, the pulse converter converts the alternate current detection signals to the pulse signal after a shifting.

In other words, in the above-described system, threshold levels are shifted. Contrary, in this case, threshold levels are not shifted, but actual alternate current detection signals themselves are shifted. Substantially equivalent effect to shifting threshold levels in the above-described system can be obtained.

Therefore, according to the wheel speed detection system of this case, even when a difference is caused between alternate current detection signals, when the facing distance is the above-mentioned certain distance, and actual alternate current detection signals, because of a change in the distance between the surface of a convex portion and the sensor head due to a change in load on axle or the such as, alternate current detection signals can be shifted in the direction to restitute the difference. Hence, wheel rotational speed can be detected accurately.

It is to be noted that, also in this case, shifting alternate current detection signals by the detection signals shifter can be constantly conducted. However, the shifting can be conducted only when, for example, it is determined to be necessary after checking actual alternate current detection voltage. The determination whether or not shifting should be conducted can be made suitably depending on the degree of a change in the facing distance.

Specifically, in this configuration, a shifting of alternate current detection signals by the detection signal shifter can be conducted, for example, so that threshold levels can be included within the amplitude range of alternate current detection signals. If alternate current detection signals are shifted so as to fall into the amplitude range of alternate current detection signals, alternate current detection signals after a shifting can be converted into pulse signals according to threshold levels. Hence, wheel rotational speed can be detected accurately.

It is to be noted that, also in this case, determination whether or not a shifting of alternate current detection signals should be conducted can be made accordingly. For example, it can be set to shift alternate current detection signals constantly, or for another example, it can also be set to shift alternate current detection signals only when threshold levels are out of the amplitude range of alternate current detection signals (such as a case in FIG. 10B).

Additionally, the degree of shifting alternate current detection signals by the detection signals shifter can be determined by various methods. Alternate current detection signals can be shifted, for example, for some level corresponding to the difference between a default average, which is an average of alternate current detection signals when the facing distance between the surface of a concave portion and the sensor head is certain distance, and the average of actual alternate current detection signals outputted from the detector.

In this case, the shifting amount can be, for example, equivalent to the amount of the difference. Alternatively, for another example, it can be set so that when the difference is little (that is, when the change in the facing distance is little), a shifting is not conducted, but a shifting is conducted only when the difference is large.

Accordingly, if the shifting amount is determined corresponding to the difference between a default average and the average of actual alternate current detection signals, threshold levels can be shifted more appropriately, and the reliability of the wheel speed detection system can be improved.

Also in the system of this case, it is possible to set, for example, only one level as a threshold level, and by determining whether alternate current detection signals are higher or lower than the level, making a pulse from alternate current detection signals can be conducted. However, in consideration of noise tolerance, it is more preferable to set two threshold levels having hysteresis.

Meanwhile, the wheel speed detection system of the present invention is applicable to various vehicles. As described above, in a linear vehicle wherein maintenance of wheels which support relatively large load is conducted frequently, it is probable that the above-mentioned facing distance is changed because of errors in assembly during maintenance, or a change in load on axle.

Consequently, the system of the present invention can be more effective to measure rotational speed of wheels disposed on a vehicle, if, for example, mounted on a railway with primary side on ground system, wherein a vehicle is propelled by magnetic interaction generated between propulsion coils disposed along a track on the ground and a magnetic field system mounted on the vehicle by distributing power to the propulsion coils. The system of the present invention makes it possible to build a wheel speed detection system with high reliability in a railway vehicle with primary side on ground system.

BEST MODE FOR CARRYING OUT THE INVENTION

Preferred embodiments of the present invention will now be described with reference to the accompanying drawings.

First Embodiment

Figure 1:
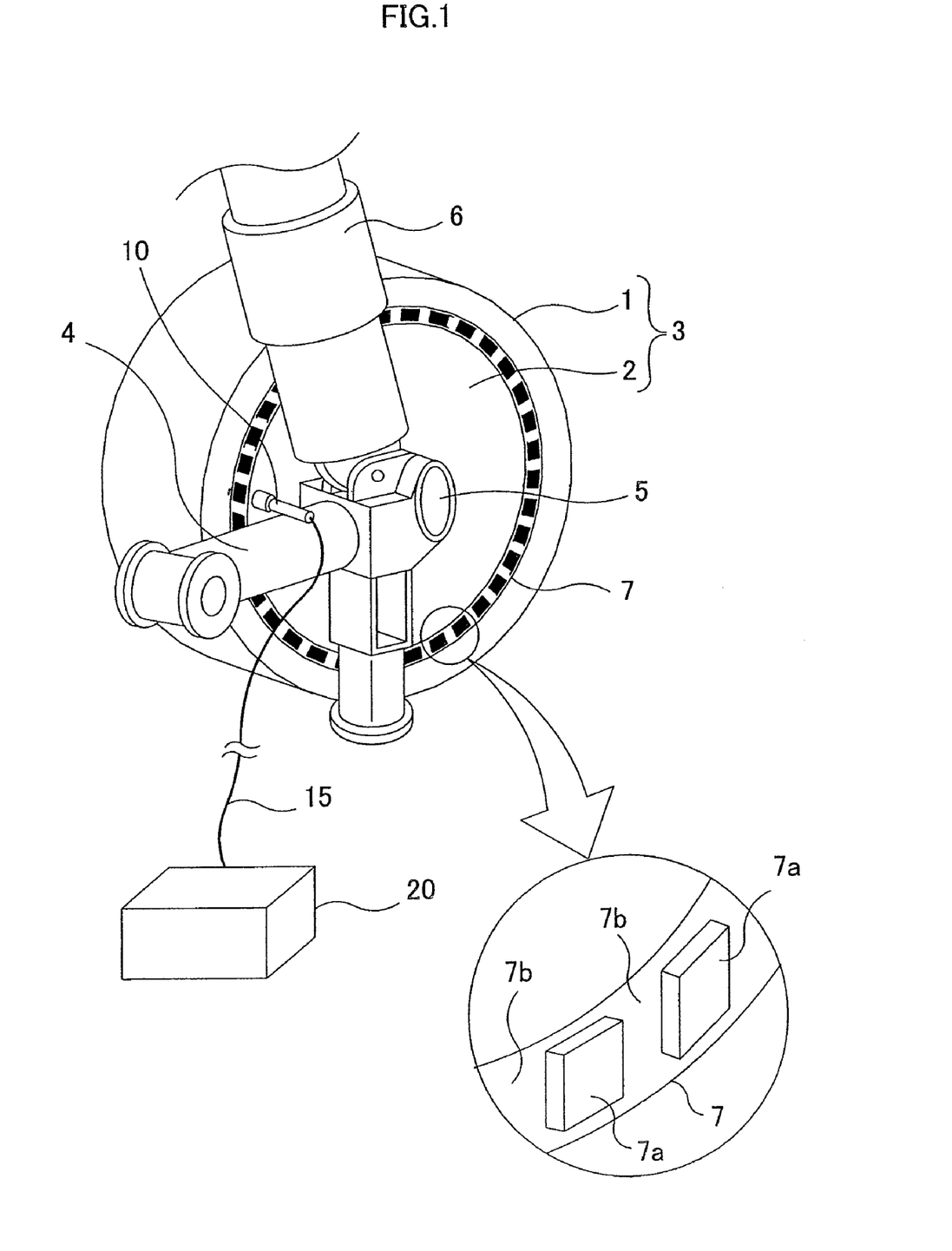
FIG. 1 is a perspective view showing a schematic structure of a support leg device comprised by a magnetically levitated train.

FIG. 1 is a perspective view showing a schematic structure of a support leg device comprised by a magnetically levitated train (linear vehicle). The linear vehicle, not shown in the drawing, is so called a train vehicle with primary side on ground system, wherein a superconducting magnet is mounted in an undercarriage as a magnetic field system, and the linear vehicle is propelled by controlling power supply to propulsion coils disposed along a track on the ground and by magnetic interaction between propulsion coils and the superconducting magnet in the vehicle. The linear vehicle floats and travels at and over predetermined speed (for example, in the low hundred km/h), but travels on wheels in a speed level lower than the predetermined speed. For a linear vehicle to travel on wheels, a support leg device shown in FIG. 1 is disposed.

As shown in FIG. 1, in the support leg device of a linear vehicle, a wheel (supporting wheel) 3 constituted with a tire 1 and a wheel (aluminum wheel) 2, as a rotator, is attached to an axle (a center of the axle) 5 disposed on one end of an arm 4. Moreover, a support leg 6 whose one end is connected to the arm 4 is constituted to be stretchable/contractable having an actuator therein. The other ends of the support leg 6 and the arm 4 are respectively connected to a bracket, not shown in the drawing. Thus, by driving the actuator in the support leg 6 and stretching/contracting the support leg 6, the wheel 3 can be moved up and down.

On the wheel 3, although not shown in the drawing, a disk brake device is mounted. The disk brake device is operated to brake a linear vehicle when the linear vehicle is traveling on the wheel 3 and in case the vehicle cannot be braked by ground control.

In the present embodiment, a wheel speed detection system comprising a concave and convex portion 7, an eddy current sensor 10, a cable 15 and a signal processing device 20, is mounted in the support leg device in order to detect rotational speed of the wheel 3 which is necessary to control the operation of the above-mentioned disk brake device.

The concave and convex portion 7 is constituted, as shown in the drawing, with convex portions 7a and concave portions 7b which are alternately formed having predetermined intervals therebetween on the periphery of the wheel 2 along the rotational direction thereof. The material of the concave and convex portion 7 in the present embodiment is aluminum. The eddy current sensor 10 is disposed and fixed on the arm 4 facing the concave and convex portion 7 with a certain distance (to be referred to as "default facing distance" hereinafter) $d_0$. Sensor detection voltage from the eddy current sensor 10 is transmitted to the signal processing device 20 via the cable 15.

Figure 2A:
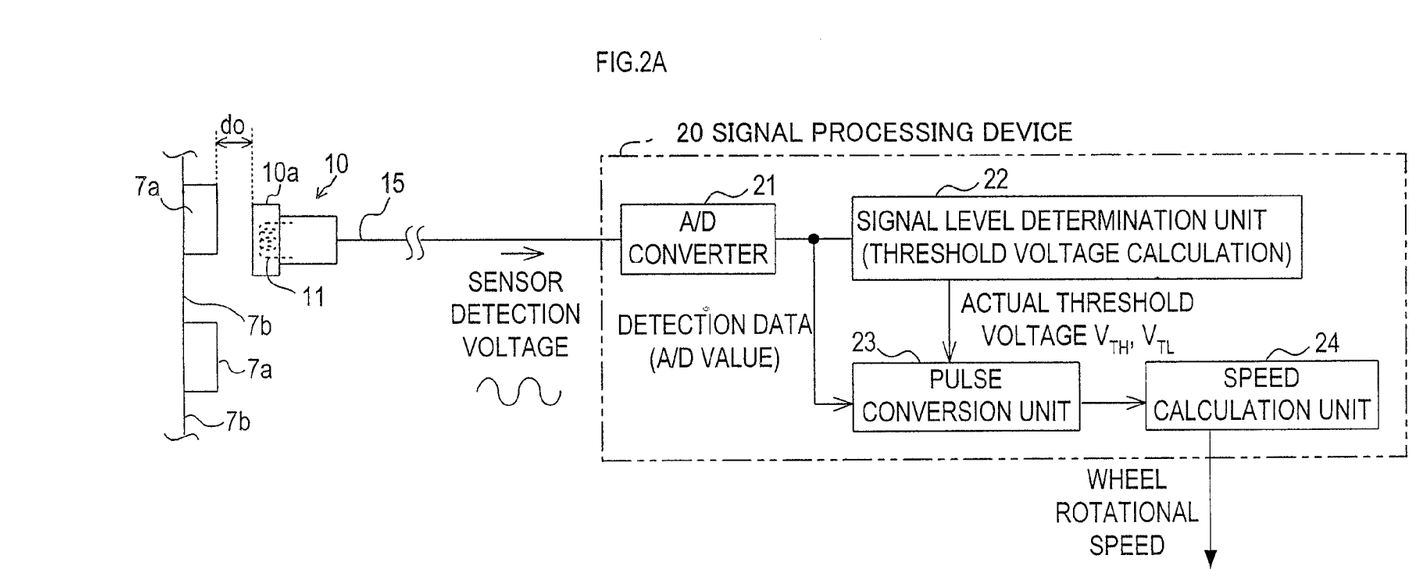
FIGS. 2A and 2B are block diagrams showing schematic structures of a wheel speed detection system of a first embodiment.

FIG. 2A shows a block diagram illustrating a schematic structure of a wheel speed detection system of the present embodiment. As shown in FIG. 2A, the eddy current sensor 10 has a detection coil 11 embedded in a sensor head 10a thereof. The distance between the sensor head 10a and a convex portion 7a is maintained to be the default facing distance. Moreover, as to be described later, sensor detection voltage (equivalent to the alternate current detection signals of the present invention) corresponding to impedance changes of the detection coil 11 is transmitted to the signal processing device 20 via the cable 15.

Figure 2B:
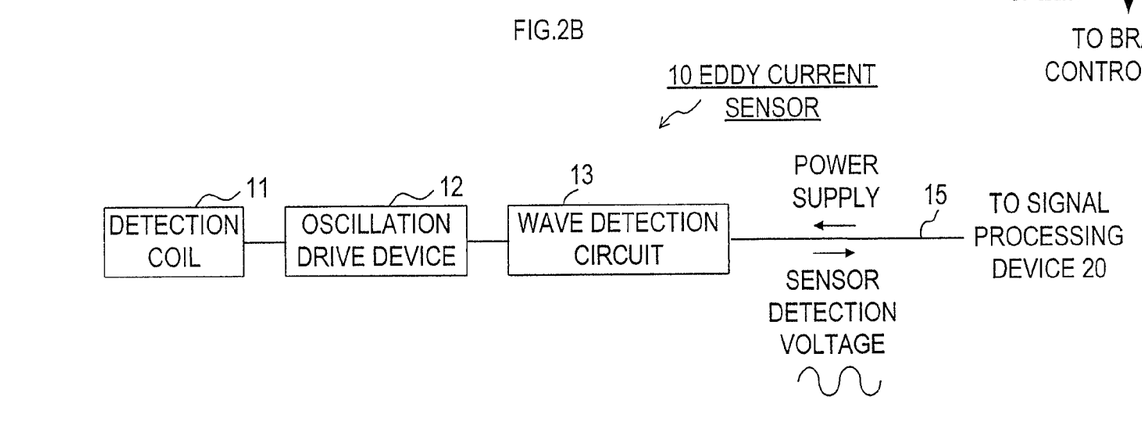

FIG. 2B shows a block diagram illustrating a schematic structure of the eddy current sensor 10. The eddy current sensor 10 mainly comprises the detection coil 11, an oscillation drive device 12 and a wave detection circuit 13. The detection coil 11 constitutes a resonant circuit together with a condenser (not shown) in the oscillation drive device 12. By the oscillation drive device 12 supplying alternate current to the resonant circuit and oscillating the resonant circuit at predetermined frequency of oscillation, high frequency current flows in the detection coil 11 and an alternate current magnetic field is generated therearound. When the wheel 3 is rotated in the alternate current magnetic field, eddy current is generated in the aluminum wheel 2.

In the present embodiment, since the concave and convex portion 7 is formed on the aluminum wheel 2 so as to face the sensor head 10a, a concave portion 7b and a convex portion 7a alternately face the sensor head 10a corresponding to the rotation of the wheel 3, such as a concave portion 7b→ a convex portion 7a→ a concave portion 7a . . . . Hence, the amount of eddy current generated in the entire part of the concave and convex portion 7 changes corresponding to the rotation of the wheel 3, and the impedance of the detection coil 11 is changed thereby.

Consequently, the oscillation amplitude of the oscillation circuit, i.e. the amplitude of oscillation voltage outputted from the oscillation drive device 12 changes corresponding to the rotation of the wheel 3. This oscillation output is picked up in an envelope detection and suitably amplified in the wave detection circuit 13, subsequently transmitted to the signal processing device 20 as sensor detection voltage. Specifically, as well as the waveforms shown FIGS. 10A and 10B described above, when a convex portion 7a faces the sensor head 10a, the amount of eddy current becomes large and the impedance change in the detection coil 11 becomes large, thus the sensor detection voltage becomes small. On the other hand, when a concave portion 7b faces the sensor head 10a, the amount of eddy current becomes small and the impedance change in the detection coil 11 becomes small, the sensor detection voltage, therefore, becomes large. It is to be noted that the power for operating the eddy current sensor 10 is supplied from the signal processing device 20.

Sensor detection voltage outputted from the eddy current sensor 10 as described above is converted into pulse signals in the signal processing device 20. Wheel rotational speed is calculated based on the pulse signals. That is, sensor detection voltage is firstly sampled at predetermined sampling frequency by an A/D converter 21, and converted into digital value. Hereinafter, this sensor detection voltage after A/D conversion is referred to as detection data (A/D value).

This detection data is inputted into a signal level determination unit 22 and a pulse conversion unit 23. Firstly, the signal level determination unit 22 is going to be described. The signal level determination unit 22 calculates threshold voltages $V_{TH}$ and $V_{TL}$ (i.e. thresholds having hysteresis) based on detection data, and outputs the voltages to the pulse conversion unit 23. More specifically, the signal level determination unit 22 conducts a threshold voltage shifting process wherein preset default threshold voltages $V_{TH0}$ and $V_{TL0}$ are shifted (moved) corresponding to detection data.

Figure 3:
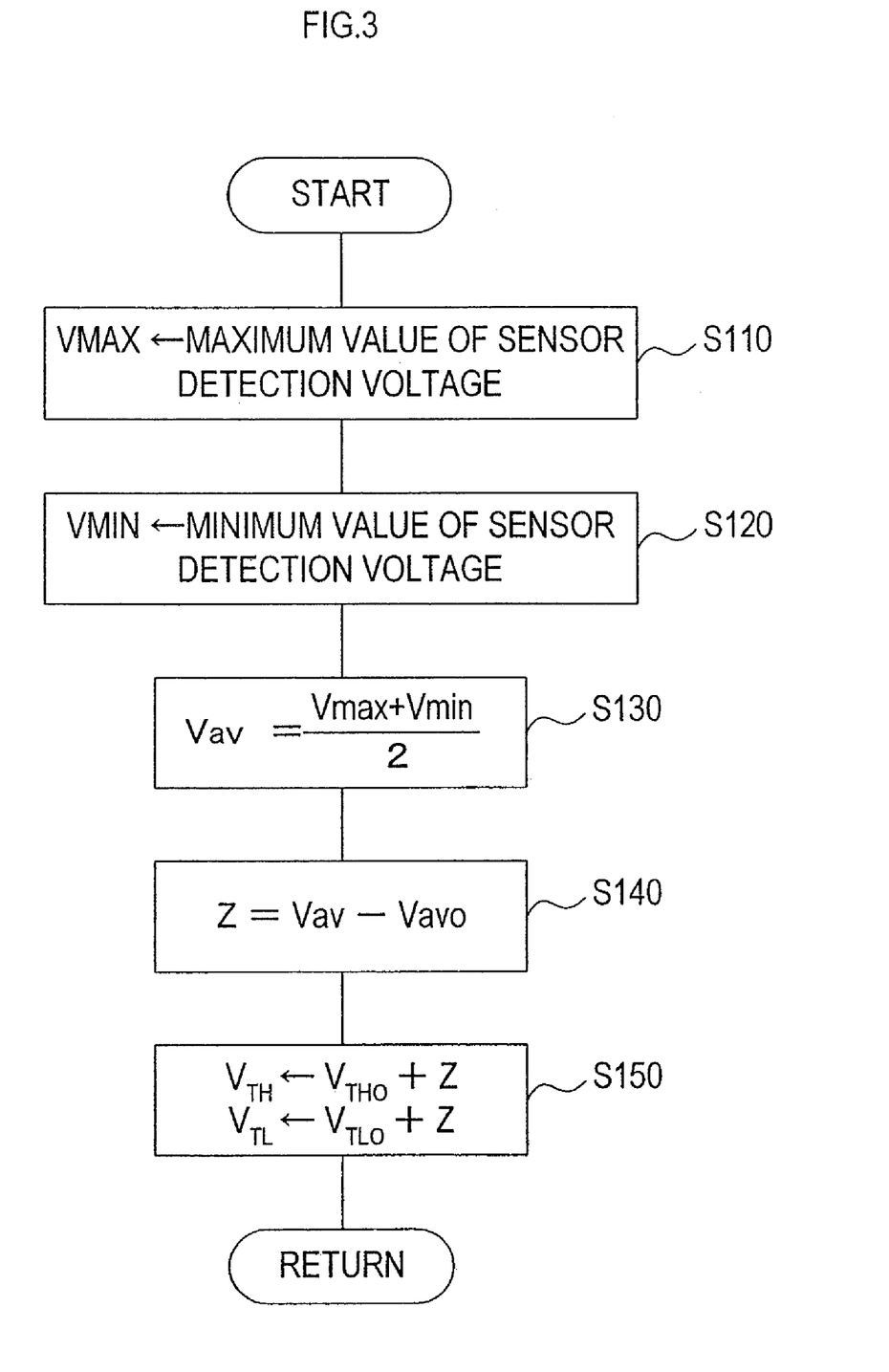
FIG. 3 is a flowchart showing a threshold voltage shifting process of the first embodiment.

FIG. 3 is a flowchart showing the threshold voltage shifting process conducted in the signal level determination unit 22. This threshold voltage shifting process is continuously conducted while a linear vehicle is traveling on the wheel 3.

When this process is started, firstly in step (to be abbreviated as "S" hereinafter) 110, the maximum value of sensor detection voltage (actually, detection data) $V_{max}$ is obtained. In the subsequent S120, the minimum value of sensor detection voltage (detection data) $V_{min}$ is obtained. In other words, the maximum amplitude value of sensor detection voltage, and the minimum amplitude value of sensor detection are respectively obtained in S110 and S120.

Subsequently, in S130, actual average voltage $V_{av}$, which is the average of the maximum value $V_{max}$ and the minimum value $V_{min}$, is calculated. Meanwhile, in the signal level determination unit 22, default average voltage $V_{av0}$ (the default average of the present invention), which is the average of sensor detection voltage when the distance between the sensor head 10a and a convex portion 7a is the default facing distance, is stored. In subsequent S140, shifting amount Z which is the difference between the actual average voltage $V_{av}$ obtained in S130 and the above-mentioned default average voltage $V_{av0}$ is calculated.

Then, in S150, by shifting the default threshold voltages $V_{TH0}$ and $V_{TL0}$ respectively for the shifting amount Z, actual threshold voltages $V_{TH}$ and $V_{TL}$ which are the actual threshold voltages, are obtained. That is, the deviation of sensor detection voltage wherein the distance between the sensor head 10a and a convex portion 7a is the default facing distance from actual sensor detection voltage is converted into the difference of average voltage (default average voltage and actual average voltage). Subsequently, this difference is dealt as the shifting amount Z of default threshold voltages $V_{TH0}$ and $V_{TL0}$. Actual threshold voltages $V_{TH}$ and $V_{TL}$ obtained as above are outputted to the pulse conversion unit 23.

In the pulse conversion unit 23, detection data from the A/D converter 21 is converted into pulse signals corresponding to the actual threshold voltages $V_{TH}$ and $V_{TL}$, and outputted to a speed calculation unit 24. In the speed calculation unit 24, calculation of wheel rotational speed is conducted based on the number of pulse signals per unit time or pulse intervals (cycle). The wheel rotational speed obtained as above is transmitted to a brake control unit, not shown, and used for controlling the disk brake device.

Figure 4A:
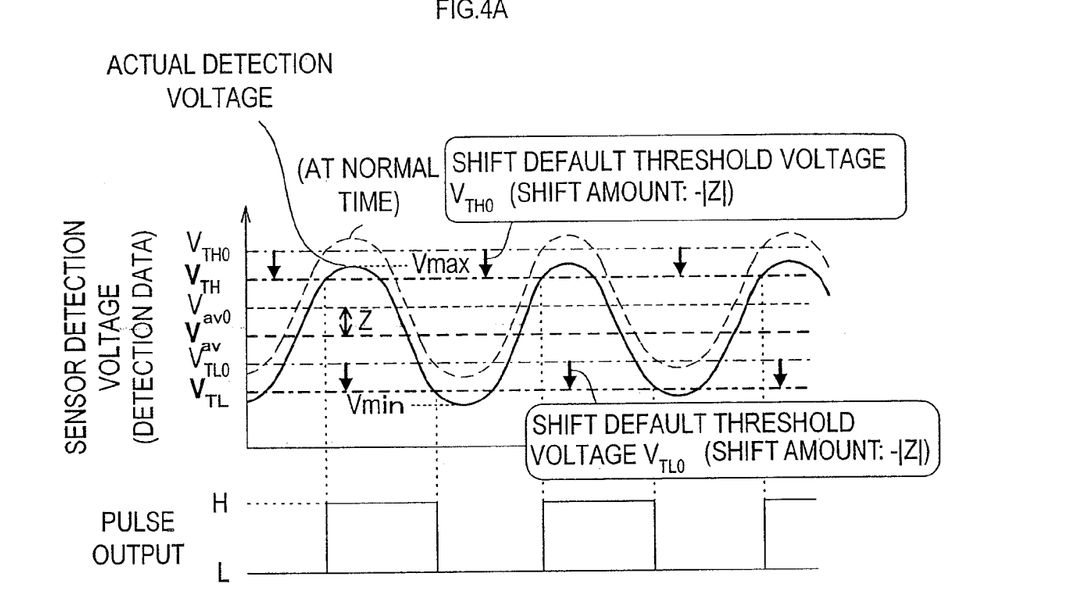
FIGS. 4A and 4B are graphs showing examples of sensor detection voltage and pulse output in the wheel speed detection system of the first embodiment, and respectively showing a case wherein a sensor and a convex portion are adjacent (4A), and a case wherein the sensor and a convex portion are distant (4B)
Figure 4B:
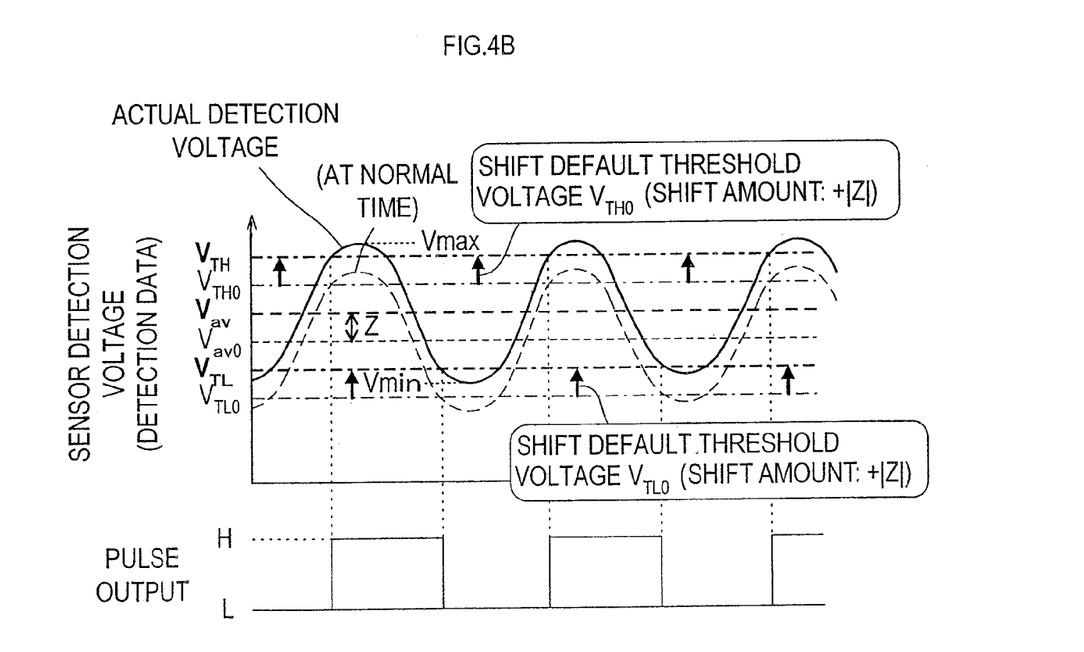

FIGS. 4A and 4B show examples of sensor detection voltage (detection data) and pulse output in the wheel speed detection system of the present embodiment. FIG. 4A shows a case wherein the sensor head 10a and a convex portion 7a are adjacent and the facing distance d therebetween becomes smaller than the default facing distance $d_0$. When the facing distance d becomes smaller than the default facing distance $d_0$ as above, sensor detection voltage becomes smaller than the sensor detection voltage when the facing distance is equivalent to the default facing distance. In the state shown in the drawing, the default threshold voltage $V_{TH0}$ is larger than the maximum value of sensor detection voltage $V_{max}$.

Consequently, in the present embodiment, by execution of the threshold voltage shifting process described in FIG. 3, actual average voltage $V_{av}$ is calculated from the maximum value $V_{max}$ and the minimum voltage $V_{min}$ of actual detection voltage, and the difference between the actual average voltage $V_{av}$ and the default average voltage $V_{av0}$ becomes the shifting amount Z. Hence, the default threshold voltage $V_{TH0}$ is shifted for the shifting amount Z to be actual threshold voltage $V_{TH}$, and the default threshold voltage $V_{TL0}$ is also shifted for the shifting amount Z to be actual threshold voltage $V_{TL}$. That is, the default threshold voltages $V_{TH0}$ and $V_{TL0}$ are respectively decreased by |Z|. Then, by eliminating actual sensor detection voltage at actual threshold voltages $V_{TH}$ and $V_{TL}$ to make a pulse, the pulse output shown in the drawing can be obtained.

On the other hand, FIG. 4B shows a case wherein the sensor head 10a and a convex portion 7a are distant and the facing distance d therebetween becomes larger than the default facing distance $d_0$. When the facing distance d becomes larger than the default facing distance $d_0$ as above, the sensor detection voltage becomes larger than the sensor detection voltage when the facing distance is equivalent to the default facing distance. In the state shown in the drawing, the default threshold voltage $V_{TL0}$ is smaller than the minimum value of the sensor detection voltage $V_{min}$.

Therefore, by execution of the threshold voltage shifting process described in FIG. 3, in the same manner described in FIG. 4A, the difference between the actual average voltage $V_{av}$ and the default average voltage $V_{av0}$ becomes the shifting amount Z. The default threshold voltage $V_{TH0}$ is shifted for the shifting amount Z to be actual threshold voltage $V_{TH}$, and the default threshold voltage $V_{TL0}$ is also shifted for the shifting amount Z to be actual threshold voltage $V_{TL}$. That is, the default threshold voltages $V_{TH0}$ and $V_{TL0}$ are respectively increased by |Z|. Then, by eliminating actual sensor detection voltage at actual threshold voltages $V_{TH}$ and $V_{TL}$ to make a pulse, the pulse output shown in the drawing can be obtained.

As described above, in the wheel speed detection system of the present embodiment, by shifting preset default threshold voltages $V_{TH0}$ and $V_{TL0}$ for the shifting amount Z, which is the difference between the average of sensor detection voltage actually detected by the eddy current sensor 10 and default average voltage, actual threshold voltages $V_{TH}$ and $V_{TL}$ are obtained. Then, according to these actual threshold voltages $V_{TH}$ and $V_{TL}$, actual sensor detection voltage (detection data) is converted into pulse signals.

Therefore, according to the wheel speed detection system of the present embodiment, even when the facing distance between a convex portion 7a and the sensor head 10a is changed due to a change in axle load or other reasons, a conversion into pulse signals is conducted according to appropriate actual threshold levels $V_{TH}$ and $V_{TL}$ corresponding to the change of the facing distance. Accordingly, irrelevant to a change in the facing distance, wheel rotational speed can be detected accurately.

Moreover, in the present embodiment, a shifting is conducted not only in a way so that default threshold voltages $V_{TH0}$ and $V_{TL0}$ fall within the amplitude of actual sensor detection voltage, but also in a way so that more appropriate shifting amount Z can be obtained based on the difference between the default average voltage $V_{av0}$ and the actual average voltage $V_{av}$. Hence, default threshold voltages $V_{TH}$ and $V_{TL}$ are more appropriately shifted corresponding to actual sensor detection voltage, and a reliable wheel speed detection system can be provided.

It is to be noted that in the present embodiment, the eddy current sensor 10 is relevant to the detector of the present invention, the pulse conversion unit 23 is relevant to the pulse converter of the present invention, the speed calculation unit 24 is relevant to the speed calculator of the present invention, and the signal level determination unit 22 is relevant to the threshold shifter of the present invention. Additionally, the threshold voltage shifting process in FIG. 3 is relevant to the process that the threshold shifter of the present invention conducts.

Second Embodiment

In the above-described first embodiment, the case wherein default threshold voltages $V_{TH0}$ and $V_{TL0}$ are shifted corresponding to a change in the facing distance between the sensor head 10a and a convex portion 7a, is described. In the present embodiment, threshold voltages are not shifted, but sensor detection voltage detected by the eddy current sensor 10 (detection data) itself is shifted, and appropriate pulse signals corresponding to a change in the facing distance are obtained.

Figure 5:
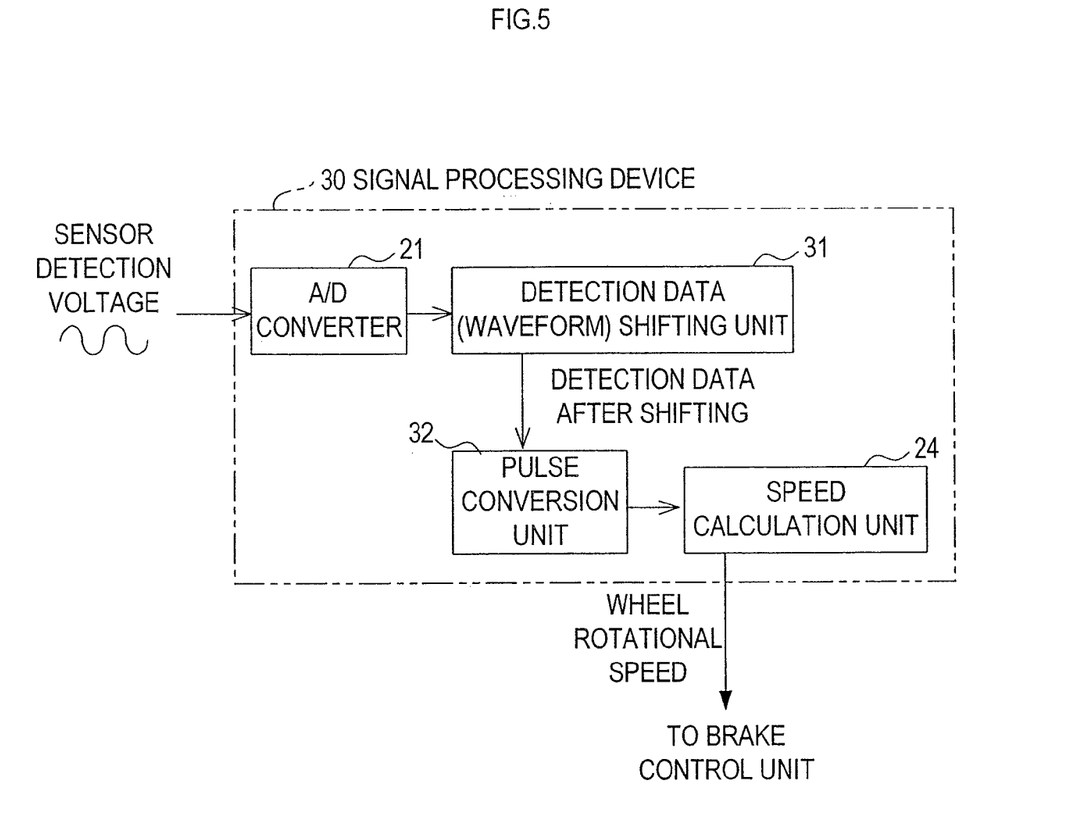
FIG. 5 is a block diagram showing schematic structure of a wheel speed detection system of a second embodiment.

FIG. 5 is a block diagram showing schematic structure of a signal processing device 30 of the wheel speed detection system of the present embodiment. The signal processing device 30 is used to substitute the signal processing device 20 of the wheel speed detection system in the first embodiment. Sensor detection voltage from the eddy current sensor 10 is firstly sampled by the A/D converter 21 at predetermined sampling frequency, and converted into detection data (A/D value) which is digital value.

This detection data is inputted into a detection data shifting unit 31, and shifted for predetermined amount. That is, in the detection data shifting unit 31, a detection data shifting process is conducted in order to shift actual detection data corresponding to the difference between the average of the detection data and preset default average voltage $V_{av0}$.

Figure 6:
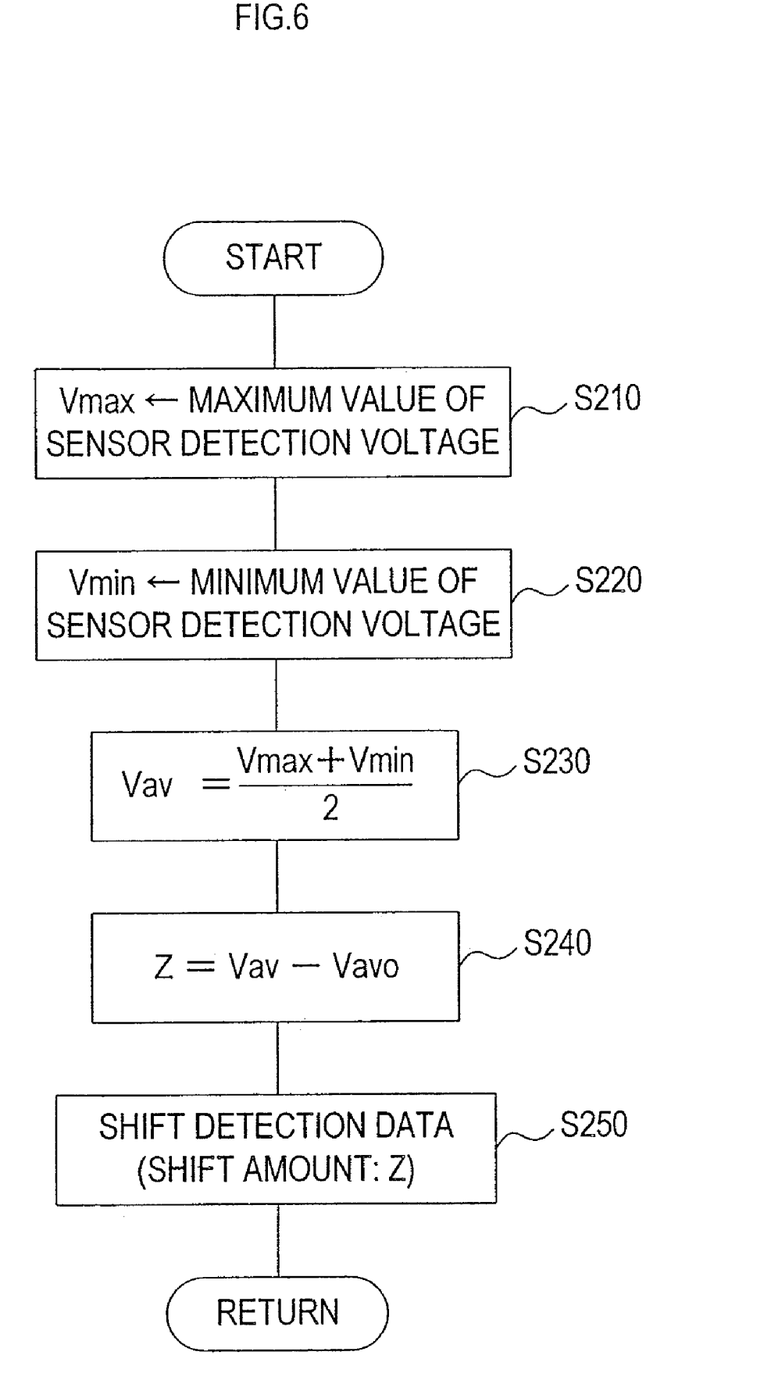
FIG. 6 is a flow chart showing a detection data shifting process of the second embodiment.

FIG. 6 is a flow chart showing a detection data shifting process executed in the detection data shifting unit 31. This detection data shifting process is also continuously conducted while a linear vehicle is traveling on the wheel 3. It is to be noted that in this process, S210 to S240 are respectively the same as S110 to S140 of the threshold voltage shifting process described in FIG. 3. Thus, the processes of S210 to S240 are not described here in detail.

That is, the maximum value $V_{max}$ and the minimum value $V_{min}$ of the detection data are respectively obtained in S210 and S220, actual average voltage $V_{av}$, which is the average of the two values, is calculated in S230, and the difference between the actual average voltage $V_{av}$ and the default average voltage $V_{av0}$ is calculated to be the shifting amount Z in the subsequent S240. Then, in S250, actual detection data is shifted for the obtained shifting amount Z.

Detection data shifted as above is inputted into the pulse conversion unit 32, and converted into pulse signals. In this pulse conversion unit 32, threshold voltages relevant to default threshold voltages $V_{TH0}$ and $V_{TL0}$ of the first embodiment are preset, and above-mentioned shifted detection data is converted into pulse signals according to these threshold voltages. Then, these pulse signals are inputted into the speed calculation unit 24, and in the same manner as in the first embodiment, wheel rotational speed is calculated based on the number of pulse per unit time or pulse intervals (cycle).

Figure 7A:
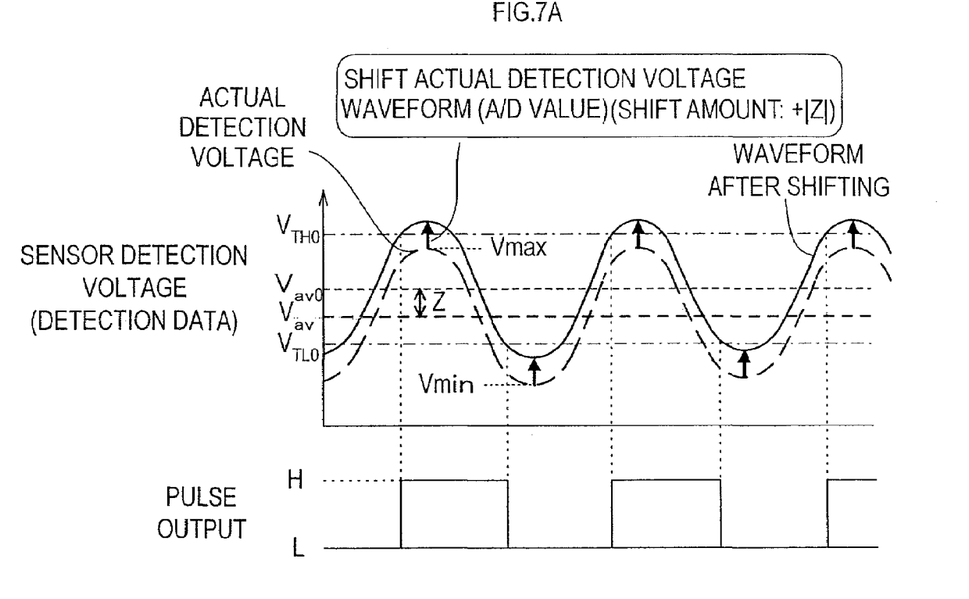
FIGS. 7A and 7B are graphs showing examples of detection voltage and pulse output in the wheel speed detection system of the second embodiment, respectively showing a case wherein a sensor and a convex portion are adjacent (7A), and a case wherein the sensor and the convex portion are distant (7B)
Figure 7B:
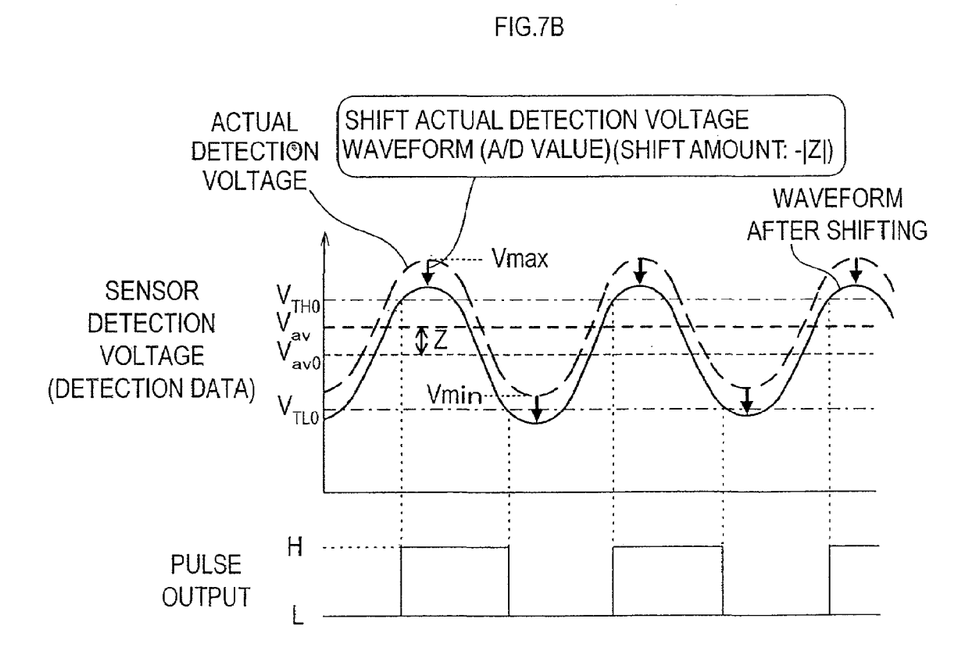

In FIGS. 7A and 7B, examples of sensor detection voltage (detection data) and pulse output in the wheel speed detection system of the present embodiment are shown. FIG. 7A shows a case wherein the sensor head 10a and a convex portion 7a are adjacent to each other and the facing distance d therebetween has become smaller than the default facing distance $d_0$. When the facing distance d becomes smaller than the default facing distance $d_0$ as above, actual sensor detection voltage becomes smaller than sensor detection voltage when the facing distance d is equivalent to the default facing distance. In the state shown in the drawing, the default threshold voltage $V_{TH0}$ has become larger than the maximum value of the sensor detection voltage $V_{max}$.

Thereby, in the present embodiment, by execution of the detection data shifting process described in FIG. 6, actual average voltage $V_{av}$ is calculated from the maximum and minimum values of actual detection voltage $V_{max}$ and $V_{min}$, and the difference between the actual average voltage $V_{av}$ and the default average voltage $V_{av0}$ becomes the shifting amount Z. Actual sensor detection voltage (detection data) is shifted for the shifting amount Z. That is, default threshold voltages $V_{TH0}$ and $V_{TL0}$ are not respectively decreased by |Z| as in the first embodiment, but detection data itself is increased by |Z|. Subsequently, by making a pulse from the shifted sensor detection voltage, the pulse output as shown in the drawing can be obtained.

On the other hand, FIG. 7B shows a case wherein the sensor head 10a and a convex portion 7a are distant and the facing distance d therebetween has become larger than the default facing distance $d_0$. When the facing distance d becomes larger than the default facing distance $d_0$ as above, sensor detection voltage becomes larger than sensor detection voltage when the facing distance d is equivalent to the default facing distance. In the state shown in the drawing, the default threshold voltage $V_{TL0}$ has become smaller than the minimum value of the sensor detection voltage $V_{min}$.

Thereby, by execution of the detection data shifting process described in FIG. 6, in the same manner as described in FIG. 7A, the difference between actual average voltage Vav and the default average voltage $Vav_0$ becomes the shifting amount Z, and actual detection data is shifted for the shifting amount Z. That is, default threshold voltages $V_{TH0}$ and $V_{TL0}$ are not respectively increased by |Z| such as in the first embodiment, but detection data itself is decreased by |Z|. Subsequently, by making a pulse from the shifted sensor detection voltage, pulse output shown in the drawing can be obtained.

Therefore, according to the present embodiment, even if a deviation of the sensor detection voltage when the facing distance is equivalent to the default facing distance from actual sensor detection voltage is caused because of the change of facing distance between the surface of a convex portion 7a and the sensor head 10a due to a change in axle load or other reasons, the sensor detection voltage (detection data) is shifted toward a direction to restitute the difference, and the same effect as the first embodiment can be achieved.

It is to be noted that in the present embodiment, the detection data shifting unit 31 is relevant to the detection signal shifter of the present invention, and the detection data shifting process in FIG. 6 is relevant to the process executed by the detection signal shifter of the present invention.

It goes without saying that embodiments of the present invention are not limited to the above described embodiments, and that variations and modifications can be adopted within the technical scope of the present invention.

For example, in the respective embodiments described above, the difference between actual average voltage $V_{av}$ and default average voltage $V_{av0}$ is set to be the shifting amount Z. Instead, the difference between the maximum (or the minimum) value of sensor detection voltage, when the facing distance is equivalent to the default facing distance, and the maximum value of the sensor detection voltage $V_{max}$ (or the minimum value $V_{min}$) can be the shifting amount Z. As far as an appropriate shifting amount Z corresponding to a change in the facing distance can be obtained, the shifting amount Z can be obtained in various ways.

Additionally, in the first embodiment described above, default threshold voltages $V_{TH0}$ and $V_{TL0}$ are preset and these default threshold voltages $V_{TH0}$ and $V_{TL0}$ are shifted for the shifting amount Z. Instead of presetting the default threshold voltages $V_{TH0}$ and $V_{TL0}$, threshold voltages can be obtained by calculating threshold voltages one by one based on the amplitude (the maximum and maximum values) of detection data actually obtained. Specifically, for example, a value which is predetermined level lower than the maximum value of actual detection data, and a value which is predetermined level higher than the minimum value of actual detection data can be threshold levels.

Furthermore, in the respective embodiments described above, even when the difference between actual average voltage $V_{av}$ and default average voltage $V_{av0}$ is small, a shifting is conducted as long as there is a difference. However, when the difference is small and ignorable, conversion into pulse signals can be normally conducted without a shifting. Hence, it can be arranged so that a shifting is not conducted every time irrelevant to the size of the difference, but a shifting is conducted only when the difference is large and normal pulse conversion cannot be expected. That is, logically, at least when threshold levels are out of the amplitude range of actual sensor detection voltage, a shifting can be conducted so that threshold levels fit into the amplitude range.

Still furthermore, in the respective embodiments described above, detection data is converted in to pulse signals by the threshold voltages having hysteresis. Alternatively, one threshold level without hysteresis can be used. However, in consideration of noise resistance, it is preferable to use threshold voltages having hysteresis as the respective embodiments described above.

Additionally, other than disposing the concave and convex portion 7 on the periphery of the rotational surface of the wheel 2 as in the above-described embodiments, the concave and convex portion 7 can be disposed, for example, on the lateral face of the wheel 2 (i.e. such as gear figuration), such as in the art disclosed in the document 1 described earlier. As long as the working-effect of the present invention can be attained, the forming position is not specially limited.

The shape of a convex portion 7a is not limited to the shape in the above-described embodiments, various shapes can be adopted as long as a change of concavity and convexity can be detected as a difference in the amount of eddy current (consequently, can be detected as change in the impedance of the detection coil 11).

Furthermore, in respective signal processing devices 20 and 30 of the respective embodiments described above, sensor detection voltage from the eddy current sensor 10 directly goes through A/D conversion. Alternatively, a high frequency wave elimination filter, for example, can be disposed before the A/D converter 21 to cut components of high frequency waves. In this way, the reliability of this system can be improved.

INDUSTRIAL AVAILABILITY

As described above, according to the wheel speed detection system of the present invention, even when the distance between the eddy current sensor and a convex portion changes due to various factors such as a change in load on a wheel or an error in assembly, it is possible to detect wheel speed accurately.

What is claimed is:

1. A wheel speed detection system comprising:
   a rotator configured to rotate on an axle center of a wheel together with the wheel, and plural concave and convex portions formed on a periphery of the rotator along a rotational direction with predetermined intervals therebetween;
   a sensor head disposed so as to face a surface of the convex portion with certain distance therebetween, and constituted with a coil to generate alternate current magnetic field therearound under supply of alternate current;
   a detector configured to excite the coil by supplying alternate current to generate eddy current on the concave and convex portions, and outputs alternate current detection signals corresponding to a change in an amount of the eddy current generated with rotation of the rotator;
   a pulse converter configured to convert the alternate current detection signals into pulse signals according to preset threshold levels; and
   a speed calculator configured to calculate rotational speed of the wheel based on the pulse signals,
   the wheel speed detection system further comprising a detection signal shifter configured to shift the alternate current detection signals outputted by the detector for some level corresponding to an actual facing distance between the surface of the convex portion and the sensor head, and
   wherein the pulse converter is configured to convert the alternate current detection signals after the shifting into pulse signals when the alternate current detection signals are shifted by the detection signal shifter; and
   wherein the detection signals shifter is configured to obtain a difference between a default average, which is an average of the alternate current detection signals when a facing distance between a surface of the concave portion and the sensor head is equivalent to the certain distance, and an average of the alternate current detection signals actually outputted from the detector, and shifts the alternate current detection signals for some level corresponding to the difference.

2. The wheel speed detection system as set forth in claim 1, wherein the detection signals shifter is configured to shift the alternate current detection signals so that the threshold levels fall within the amplitude range of the alternate current detection signals.

3. The wheel speed detection system as set forth in claim 1, wherein the threshold levels are constituted with two threshold levels having hysteresis.

4. The wheel speed detection system as set forth in claim 1, wherein the plural concave and convex portions are disposed on a side surface of the rotator.

5. The wheel speed detection system as set forth in claim 1, wherein the shifting the alternate current detection signals outputted by the detector for some level corresponding to an actual facing distance between the surface of the convex portion and the sensor head is a shifting of voltage.

6. A wheel speed detection system comprising:
   a rotator configured to rotate on an axle center of a wheel together with the wheel, and plural concave and convex portions formed on a periphery of the rotator along a rotational direction with predetermined intervals therebetween;
   a sensor head disposed so as to face a surface of the convex portion with certain distance therebetween, and constituted with a coil to generate alternate current magnetic field therearound under supply of alternate current;
   a detector configured to excite the coil by supplying alternate current to generate eddy current on the concave and convex portions, and outputs alternate current detection signals corresponding to a change in an amount of the eddy current generated with rotation of the rotator;
   a pulse converter configured to convert the alternate current detection signals into pulse signals according to preset threshold levels; and
   a speed calculator configured to calculate rotational speed of the wheel based on the pulse signals;
   the wheel speed detection system further comprising a detection signal shifter configured to shift the alternate current detection signals outputted by the detector for some level corresponding to an actual facing distance between the surface of the convex portion and the sensor head;
   wherein the pulse converter is configured to convert the alternate current detection signals after the shifting into pulse signals when the alternate current detection signals are shifted by the detection signal shifter; and
   wherein the detection signals shifter is configured to shift the alternate current detection signals so that the threshold levels fall within the amplitude range of the alternate current detection signals.

7. The wheel speed detection system as set forth in claim 6, wherein the threshold levels are constituted with two threshold levels having hysteresis.

8. The wheel speed detection system as set forth in claim 6, wherein the plural concave and convex portions are disposed on a side surface of the rotator.

9. The wheel speed detection system as set forth in claim 6, wherein the shifting the alternate current detection signals outputted by the detector for some level corresponding to an actual facing distance between the surface of the convex portion and the sensor head is a shifting of voltage.

* * * * *